United States Patent [19]
Benninger

[11] Patent Number: 5,462,323
[45] Date of Patent: Oct. 31, 1995

[54] CAB WINDOW SECURITY DEVICE

[76] Inventor: Keith G. Benninger, 1-163 Union St East, Waterloo, Ontario, Canada, N2J 1C4

[21] Appl. No.: 225,807

[22] Filed: Apr. 11, 1994

[30] Foreign Application Priority Data

Apr. 13, 1993 [CA] Canada ........................... 2093883

[51] Int. Cl.$^6$ .................................................. E05C 19/18
[52] U.S. Cl. ........................ 292/292; 292/288; 292/266; 292/DIG. 46
[58] Field of Search ............................. 292/339, 258, 292/8, 24, 116, DIG. 6, 295, 292, 288, 289, DIG. 46, 262, 266, DIG. 47, 265, 275

[56] References Cited

U.S. PATENT DOCUMENTS

| 320,551 | 6/1885 | Gilmore. | |
|---|---|---|---|
| 321,775 | 7/1885 | Woodward | 292/295 |
| 476,031 | 5/1892 | Bigelow. | |
| 897,423 | 9/1908 | Stenberg | 292/258 |
| 1,548,296 | 10/1923 | Williams. | |
| 1,599,971 | 9/1926 | Melsom | 292/265 |
| 1,803,084 | 4/1931 | Wiziarde et al. | |
| 1,954,739 | 4/1934 | Lyons. | |
| 2,505,400 | 4/1950 | Hinds | 292/288 |
| 2,514,738 | 7/1950 | Bradley | 292/258 |
| 2,775,001 | 12/1956 | Baker. | |
| 3,014,747 | 12/1961 | Nichols. | |
| 3,172,280 | 3/1965 | Cohen. | |
| 3,416,827 | 12/1968 | Cole | 292/288 |
| 3,471,189 | 10/1969 | Ness. | |
| 3,550,409 | 12/1970 | Pariser. | |
| 3,664,164 | 5/1972 | Zaidener. | |
| 4,003,227 | 1/1977 | Casey | 292/258 X |
| 4,105,233 | 8/1978 | Levey | 292/288 |
| 4,285,535 | 8/1981 | Leary. | |
| 4,405,166 | 9/1983 | Lovis. | |
| 4,788,796 | 12/1988 | Matthews | 292/288 X |
| 4,846,513 | 7/1989 | Mathis, II | 292/262 |
| 5,125,699 | 6/1992 | Dinan | 292/DIG. 47 |

Primary Examiner—Rodney M. Lindsey
Attorney, Agent, or Firm—Anthony Asquith & Co.

[57] ABSTRACT

The sliding windows in the back of the cab of a pick-up truck are vulnerable to break-ins because a thief can pry the panes apart using friction from the pressure of his hand on the panes. The normal clamp is by-passed during this type of break-in. An adjustable-length strut is formed with hook-shaped ends. The hook-ends engage around the outer edges of the sliding panes. A catch on the strut comprises a peg which is spring-loaded into engagement with a notch. When the driver presses the peg, he thereby disengages the catch on the strut, allowing the strut to be set to the length where the hook ends can be engaged to and disengaged from the edges of the panes.

13 Claims, 2 Drawing Sheets

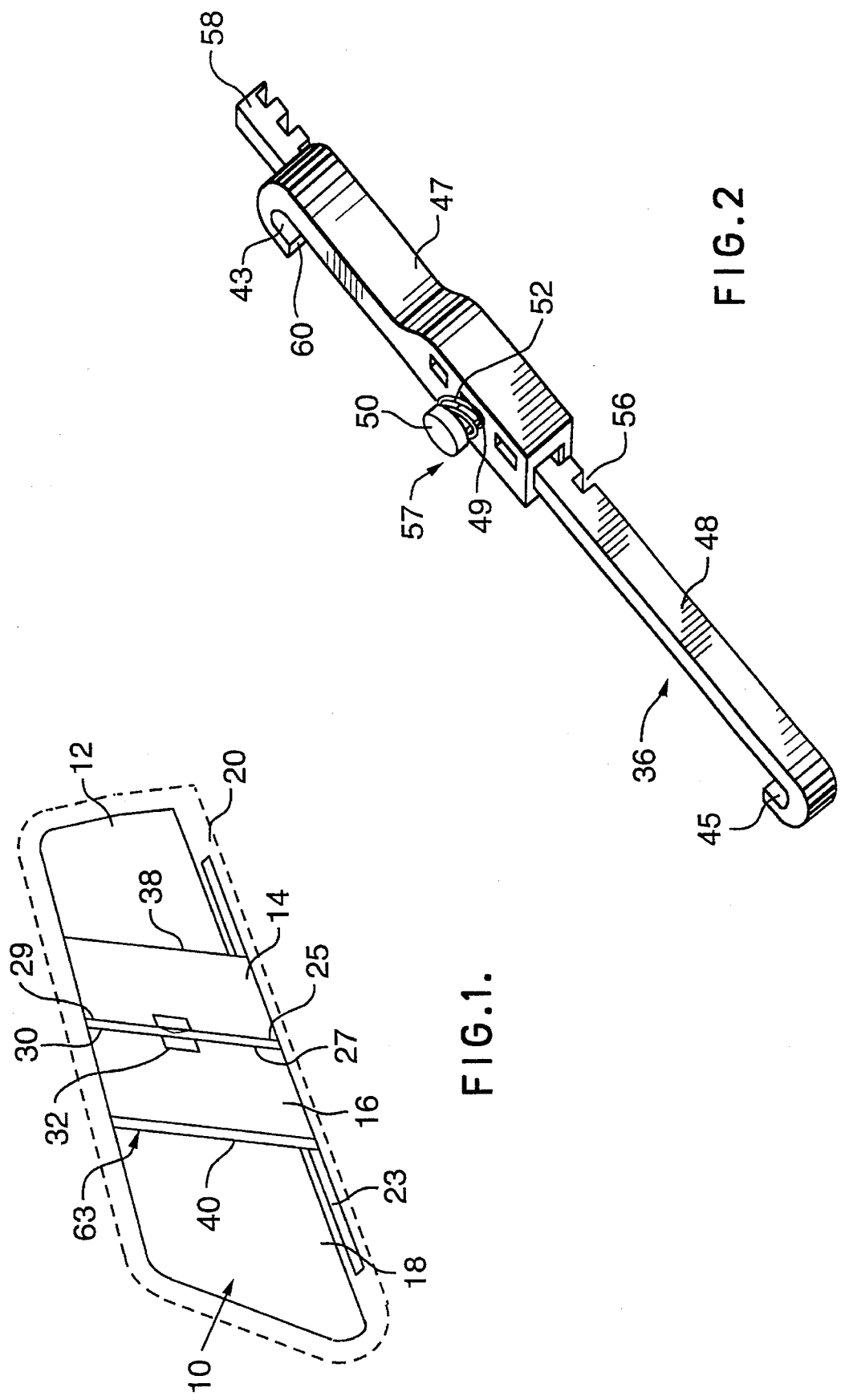

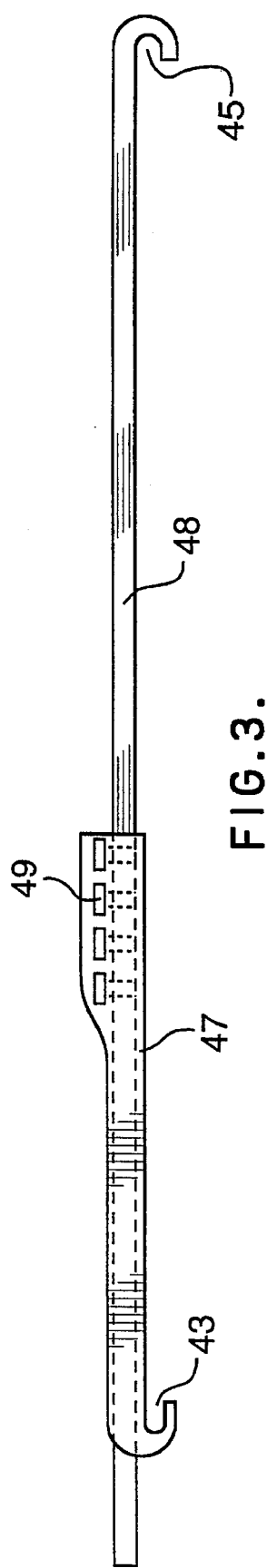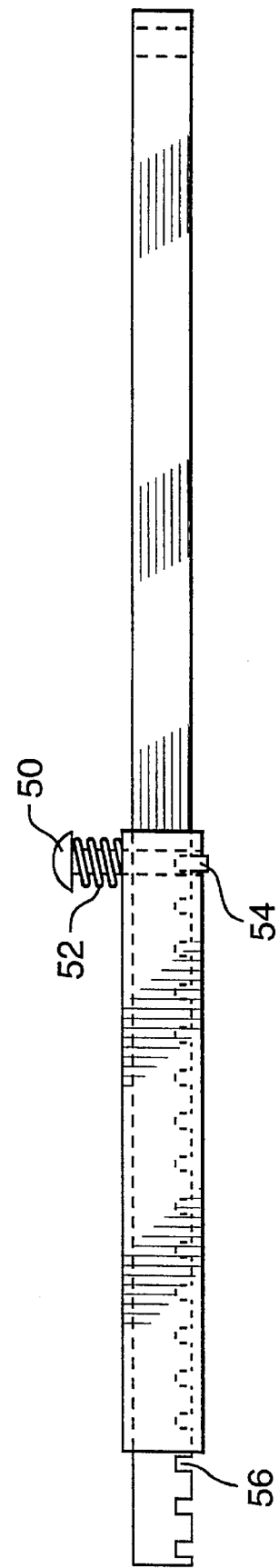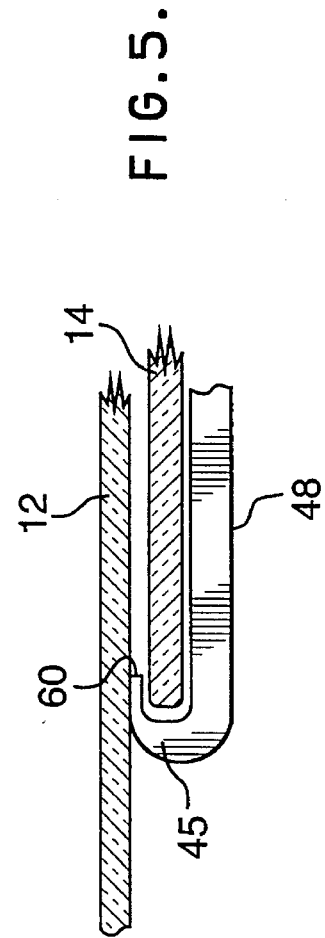

CAB WINDOW SECURITY DEVICE

This invention relates to the security of sliding windows, of the type used in the rear windows of the cabs of such vehicles as pick-up trucks.

One reason for the high number of break-ins into the cabs of trucks of course is that a casual thief has been able to pry apart the sliding windows, and thus force an entry into the cab.

It has often been noted that no vehicle security system is proof against a determined thief who is willing to smash the windows of the vehicle, and has the opportunity and the wherewithal to do so, and the present invention also is not intended to be proof against such a thief. However, a security system which provides some resistance against a thief trying to force the windows is still very worthwhile, and is generally seen as being effective against casual thieves. It is casual theft which is the main security problem with vehicles, and especially with break-ins associated with forcing the sliding windows of truck cabs.

The invention lies in providing a strut of adjustable length, the strut having hooked ends, whereby the strut can be hooked over the edges of the sliding window panes.

In the conventional arrangement of sliding windows in truck cabs, two inner panes are arranged for sliding, and these two inner panes, when the window is closed, lie with their inner edges together. The window is opened by sliding the two panes apart. A clamp is provided, which is accessible only from inside the cab, for holding the sliding panes in the closed relation.

It is recognised that the sliding panes present two edges, namely the respective outer edges of the sliding panes, which are available to be held together by a hook-ended strut, and, when held together, the windows are secure. It is recognised that the outer edges of the Sliding panes can be held together by such a simple means as an adjustable-length strut with hooked ends.

It is recognised that sliding windows in truck cabs are unlike other types of sliding window. The truck type of sliding window makes two exposed edges available inside the cab, and the exposed edges are therefore accessible to hook ends.

It may be noted that sliding windows in houses, for example, are generally not like that, to the extent that in such other types of sliding windows there is nowhere to attach a hook-ended strut as a security device. In these other types of sliding windows, if a strut were to be used as a security device, some kind of attachment has to be made to the window, or to the window frame, or to the surrounding structure, in order to secure the ends of the strut.

It is recognised that the outer edges of the sliding panes of the cab-type of sliding window constitute locations to which it is very conveniently accessible to attach a hook-ended security strut. It is recognised also that no screw threads or other fasteners or other modification is required to the window panes, nor to the window frame, nor to the surrounding structure. The hook ended strut simply fits to the edges of the sliding window panes> The edges of the panes are already present and available to the hook ends without any modifications being required.

Sliding windows in truck cabs of course are provided with weatherstripping. It may be noted, however, that the sliding panes themselves do not have weatherstrips on their outer edges. Therefore, the outer edges of the sliding panes are available for engagement by the hooks of the variable-length strut without problems due to the presence of weatherstrips on those edges. Such weatherstripping as is provided by the truck manufacturer, between the outer pane and inner pane, is secured to the inner edge of the outer pane, not to the outer edge of the inner pane, leaving the outer edge of the inner pane free for engagement with the hooks of the strut. If the outer edges of the inner panes were covered over with weatherstrips, engaging the hooks with those edges would be rather impractical.

Once fitted in place, with the hooks engaged over the edges of the sliding panes, the strut preferably should be positively locked for best security. A positive lock is preferred rather than, for example, the strut being spring loaded together, or friction gripped. An example of a suitable positive lock is the engagement of a tongue in a notch, which will be described later. The strut can be adjusted to a set length from inside the cab, so the strut need not be locked with a key, since the thief can only release-the strut if he has already broken into the cab.

It is an aim of the invention that the hook-ended variable-length strut is very convenient to fit and install. No tools are required for installation or use. The strut is ready instantly for operational use, immediately upon placing the strut in the cab. No tools, keys, combinations, or the like, are required to make the sliding windows secure.

DETAILED DESCRIPTION OF PREFERRED EMBODIMENT

By way of further explanation of the invention, an exemplary embodiment of the invention will now be described with reference to the accompanying drawings, in which:

FIG. 1 is a pictorial view from inside the cab of a vehicle, showing sliding windows of the kind that are suitable for use in the invention;

FIG. 2 is a pictorial view corresponding to FIG. 1 of an adjustable length strut according to the invention;

FIG. 3 is a plan view of the strut of FIG. 2;

FIG. 4 is side elevation of the strut of FIG. 2.

FIG. 5 is a view of a hook of the strut of FIG. 1, in operation.

The apparatus shown in the accompanying drawings and described below is an example which embodies the invention. It should be noted that the scope of the invention is defined by the accompanying claims, and not necessarily by specific features of exemplary embodiments.

FIG. 1 shows the rear window 10 of the cab of a conventional pick-up truck. The whole window 10 comprises four panes of glass: a right outer pane 12, a right inner pane 14, a left inner pane 16, and a left outer pane 18. The two outer panes 12, 18 are fixed into the window frame 20, and are not able to slide or open or otherwise move.

The two inner panes 14, 16 are slidable in a slide-track 23 formed in the window frame 20. To open the window, the driver slides the inner panes 14, 16 apart, so that the inner panes lies over the respective outer panes 12, 18.

When the window is closed, the left edge 25 of the right inner pane 14, and the right edge 27 of the left inner pane 16, are in abutment. Weather seal strips 29,30 seal the inner panes edge to edge, and a clamp 32 locks the inner panes together in the closed position.

This is the conventional arrangement on most makes of pick-up truck, of the kind having openable rear windows in the cab. The clamp 32 does not need to be locked with a key, because the clamp is only accessible inside the cab.

The problem of poor security in cab sliding windows arises because of the weather seal and clamp arrangement.

The weather seal comprises a pair of complementary plastic extrusions 29,30, which clip over the inner edges of the inner panes 14, 16. The strips are held to the panes by their own friction grip, which is sometimes reinforced by adhesive. The components of the clamp 32 are glued or otherwise secured to the respective weather seal strips 29,30.

This arrangement is secure (up to a point) against a thief trying to pry the inner panes 14, 16 apart by inserting a tool between the weather seal strips 29,30; it is secure because the force of pressing the strips apart serves to press the strips more firmly onto the panes. In order to gain entry by this method, the thief would have to use enough force to break the clamp 32, or to break the window. (If the thief is prepared to use that amount of force there is not much that can be done to stop him.)

However, the arrangement is not secure against a casual thief who presses the panes themselves apart. Often, no tool is needed to press the panes 14,16 apart: simply laying the flats of the hands against the panes generates enough friction that a considerable force can be applied to the panes. Now, the only resistance against the thief is the friction grip of the weather seal strips 29,30 on the edges of the panes 14, 16: if just one strip comes loose from its pane, the inner panes can be slid apart. Once one of the strips has been loosened, the clamp 32 is by-passed.

Of course, this is not easy for the thief to do. But it is certainly true that, with practice, a thief can in many cases drive apart the inner panes 14, 16, forcing one of the weather strips 29,30 off its pane, just by using his hands. Even if the weather strips 29,30 are glued onto the panes 14, 16, all too often the this can even overcome the extra resistance of the glue.

As mentioned, the clamp 32 is by-passed when this method of breaking-in is used, whereby of course it would serve no purpose to fit a stronger clamp.

The adjustable-length strut 36 fits over the outer edges of the inner panes, ie over the right edge 38 of the right inner pane 14 and over the left edge 40 of the left inner pane 16. Hooks 43,45 at the ends of the strut are shaped so as to engage the edges 38,40 of the inner panes.

The strut 36 has a female component 47 and a male component 48. The female component 47 is formed with a through hole 49, in which is housed a peg 50. A spring 52 urges the peg 50 to an at-rest position. In the at-rest position, a tongue 54 of the peg 50 resides in one of a series of notches 56 formed along one edge of the male component 48. The engagement of the peg 50 with the male component 48 comprises a catch 57, whereby the length of the strut 36, ie the distance apart of the hooks 43,45, is positively locked.

To adjust the length of the strut, a person presses the handle or button of the peg 50 against the spring 52, which releases the tongue 54 from the notch 56, which then allows the male component 48 to slide lengthwise relative to the female component 47. In fact, the male component can be withdrawn completely from the female component if the peg 50 remains pressed.

The hole 49 down the centre of the female component 47 is a through-hole, so that the free end 58 of the male component 48 may be pushed right through and may protrude therefrom.

The female component 47 comprises a hollow tube, of moulded plastic. The male component 48 is also of moulded plastic.

In use, with the window panes 14, 16 closed, and abutted together, and with the clamp 32 in place, the driver applies the strut 36 to the edges 38,40 of the panes 14, 16. He presses the peg 50, and, holding the female component in one hand (being the hand that is being used to press the peg 50) and the male component in the other hand, he adjusts the length of the strut until the hooks 43,45 engage behind the edges 38,40 of the sliding panes.

Both the male and the female components 47,48 are of such shape and dimensions as to be easily grasped in the hand. The components may be formed with shapes or tabs etc, if desired, such as will facilitate positioning and manipulation of the strut. The length of engagement of the components is such as to constrain and properly guide the components for relative sliding, without tipping or tending to become jammed.

When the driver has addressed the hooks 43,45 of the strut 36 to the edges 38,40 of the window panes, he releases the peg 50, and eases the components apart until the tongue 54 snaps into the next available one of the notches 56.

Now, the strut 36 remains in place, hooked around the edges 38,40 of the panes, and preventing the panes from being separated. Now, to break in, the thief must separate the sliding window panes 14, 16 with enough force to break either the hooks 43,45 or the peg 50. This gives excellent security; again, if the thief is willing to use as much force as that he can in any event simply smash the windows.

When installing the strut, as mentioned the user eases the components apart so that the hooks pass around the edges of the panes, and then presses the components together so that the hooks engage the edges of the panes. As may be seen in FIG. 5 when the hook 43 is engaged, the tip portion 60 of the hook fits into the gap 63 between the sliding pane 14 and the fixed pane 12.

The user telescopes the components together until the hooks are tight against the edges 38,40 of the panes, and then he backs off the strut until the tongue 54 snaps into the next available one of the notches 56. The notches should be of small enough pitch to ensure that when the tongue drops into the next notch the tips 60 of the hooks are still firmly engaged around the edges of the panes. Thus, the lengths of the tip portions 60 of the hooks should be greater than the pitch of the notches 56. That is to say, to ensure the hook ends cannot fail clear of the edges of the panes, the designer should specify a small distance apart of the notches, and should specify a good length to the tips 60 of the hooks.

The designer can create the same effect that would be gained by increasing the pitch of the notches by adding more pegs, as shown in FIGS. 2 and 3, the extra pegs being spaced apart by a distance that is not equal to the pitch spacing of the notches.

When fitted in place, the strut 36 is not tight on the window panes 14,16 because the strut is always backed off to some extent before the tongue drops into the next notch. The strut can therefore be expected to settle to the bottom of the panes, and will in fact rest on the sill of the window frame 20.

When the truck is occupied and the window panes 14, 16 are opened for ventilation, the question arises as to where the strut 36 is to be kept or stored. It is convenient to open out the strut at this point, and in fact to keep the ends of the strut hooked around the edges 38,40 of the opened sliding panes, since this is a convenient place for storage of the strut when the window is open. Thus, the length of the male component should be long enough to allow the hooks still to engage the edges 38,40 when the window is open.

Of course, no vehicle security device is effective if, the user forgets to set the device when he leaves the vehicle. It may be noted that the device as described requires a memorable specific activity (as opposed to the setting of the clamp 32) whereby the driver will readily form the habit of checking, every time he leaves the vehicle, whether the strut is in place. The setting of the strut is very simple and undemanding, and can even be done with just one hand, so the driver is not likely to avoid setting the device on the grounds that the task is too tiresome. Often, the window is not opened for long periods (in fact some drivers never open the back-window of the cab at all) and so the strut remains in place without needing to be reset.

The strut is neither physically nor visually obtrusive when set into position to hold the panes together. Equally, however, the strut can be plainly seen, if a person is looking for it. Thus the driver can quickly see at a glance, upon leaving the truck, that the strut is in place. Also, a thief who is trying to pry the windows apart can see that the strut is in place.

The strut can be made of a size that is suitable for universal fitment to a wide range of trucks. In fact, of the different trucks that have sliding windows, the windows having outside edges that are exposed and available for engagement by the hook tips, the distance apart of the outside edges of the sliding panes does not vary much. In any case, the male component 47 is readily formed with a rack of notches 56 which permits adjustment of the strut over the required range of lengths.

Sliding window panes are generally about 5 mm thick, and the hook tip should be spaced from the hook body by a corresponding distance. The hook tip must be fairly slender, since the tip has to fit between the inner pane and the outer pane. The tip should be long enough that when the strut is backed off during fitment the tips still remain engaged behind the edges of the panes. The stem and base of the hook should be thick and chunky to provide a firm and rigid support for the slender tip.

The catch 57 is simple enough that the driver can easily manipulate the catch even though he has to turn in his seat to do so (the window being behind the driver). The driver quickly gets the hang of operating the catch 57, and of setting the length of the strut, with one hand. From the security standpoint, it does not matter that the strut is easy to set to the required length.

I claim:

1. A security device for a vehicle, wherein:

the vehicle is of the kind that includes a window, and includes a slideway, with respect to which at least one of a left pane and a right pane of the window is slidable between open and closed positions;

the vehicle is of the kind in which, when the window is in the closed position, the right edge of the left pane and the left edge of the right pane lie together, and the left edge of the left pane and the right edge of the right pane lie apart and facing outwards;

the security device comprises a strut, having complementary left and right components, the components being arranged for relative telescopic sliding, whereby the strut is adjustable in length;

the left component of the strut is formed with a left hook, which is so shaped as to be suitable to be hooked ground the left edge of the left pane, and which, in use of the device on the vehicle, is hooked around the left edge of the left pane;

the right component is formed with a right hook, which is so shaped as to be suitable to be hooked around the right edge of the right pane, and which, in use of the device on the vehicle, is hooked around the right edge of the right pane;

the strut is telescopable in length to the extent that the hooks can fit into engagement with the edges of the panes, and that the hooks can be disengaged from the edges of the panes, when the panes are in the closed position;

the security device includes a manually operable catch, which, when manually operated, is effective to permit movement of the two components in the direction of separation of the hooks, and which, when manually released, is effective to prevent that said movement.

2. The device of claim 1, wherein a first one of the components is formed with at least one notch, the catch is mounted in the other of the components, and the catch includes a tongue which is operable into and out of engagement with the notch.

3. The device of claim 2, wherein the catch is of the manually-operable-spring-back, normally-engaged, type.

4. The device of claim 3, wherein the catch includes a spring which urges the tongue into engagement with the notch, and the tongue includes a handle whereby the tongue can be manually moved out of engagement with the notch, against the force of the spring.

5. The device of claim 2, wherein the first component is formed with a rack of the said notches, spaced regularly along the length thereof, and the pitch of the notches is less than the length of a tip portion of the hook.

6. The device of claim 1, wherein the components are in male/female relationship, one component being guided and constrained for telescopic sliding by and within the other.

7. The device of claim 6, wherein the components are both plastic mouldings.

8. The device of claim 1, wherein, in respect of both the hooks:

the hook comprises a stem portion, a base portion, and a tip portion;

the tip portion of the hook is slim;

and the base as portion and the stem portion of the hook are of thick and chunky dimensions compared to the tip portion.

9. The device of claim 1, wherein the vehicle includes a sealing means, which is attached to the right edge of the left pane and to the left edge of the right pane, and which is effective, when the said edges lie together, to provide a weather-proof seal between the panes.

10. The device of claim 9, wherein the vehicle is of the type in which the right edge of the right pane and the left edge of the left pane are exposed and unsealed.

11. The device of claim 8, wherein:

the vehicle has left and right fixed panes in addition to the left and right sliding panes, the fixed panes being arranged face to face with respect to the sliding panes;

the vehicle is such that there is a narrow space between the sliding panes and the fixed panes;

the tip portion of the hook is slim enough over the length of its tip portion that the lip portion can be inserted over its length into the narrow space;

the stem portion of the hook is long enough that each one of the panes fits between the base portion and the tip portion;

the stem portion of the hook is short enough that, when the device is in use, the components lie against an inside surface of the sliding panes, and the tip portions of the hooks lie against the opposite, inner surface of the fixed panes.

12. The device of claim 11, wherein:

the first component is formed with a rack of notches, spaced regularly along the length thereof, and the pitch of the notches is less than the length of a tip portion of the hook;

the notches are of small enough pitch to ensure that when the tongue drops into the next notch the tips of the hooks are still firmly engaged around the edges of the sliding panes.

13. The device of claim 1, wherein the device is long enough that the device can be telescoped until the tips of the hooks can be hooked round the edges of the sliding panes, even when the sliding panes are wide open with respect to the slideway.

* * * * *